(12) United States Patent
Nowakowska et al.

(10) Patent No.: US 8,741,156 B2
(45) Date of Patent: Jun. 3, 2014

(54) HYBRID PHOTOCATALYSTS, THE METHOD OF THEIR SYNTHESIS AND USE

(75) Inventors: Maria Nowakowska, Cracow (PL); Krzysztof Szczubialka, Krzywaczka (PL); Dominik Drozd, Bochnia (PL)

(73) Assignee: Uniwersytet Jagiellonski, Cracow (PL)

( * ) Notice: Subject to any disclaimer, the term of this patent is extended or adjusted under 35 U.S.C. 154(b) by 0 days.

(21) Appl. No.: 13/217,946

(22) Filed: Aug. 25, 2011

(65) Prior Publication Data

US 2011/0303617 A1   Dec. 15, 2011

Related U.S. Application Data

(63) Continuation of application No. PCT/PL2010/000016, filed on Feb. 24, 2010.

(30) Foreign Application Priority Data

Feb. 25, 2009  (PL) .......................................... 387344
Feb. 25, 2009  (PL) .......................................... 387345

(51) Int. Cl.
  *B01J 31/26*   (2006.01)
  *C02F 1/72*    (2006.01)
  *C02F 1/32*    (2006.01)
  *B01J 37/34*   (2006.01)

(52) U.S. Cl.
  USPC ...... 210/748.14; 502/167; 502/172; 502/150; 502/164; 502/159; 502/162; 502/62; 210/748.01; 210/748.09; 210/748.1; 210/748.11; 422/186; 422/186.3; 252/587; 252/301.36; 521/50

(58) Field of Classification Search
  USPC ............... 210/748.01, 748.09, 748.1, 748.11, 210/748.16, 748.14, 748.18, 749, 660, 348, 210/153, 767, 758, 763; 422/20, 24, 27, 28, 422/186, 186.3; 502/167, 172, 150, 164, 502/163, 159, 62, 162; 252/301.36, 587; 106/712; 428/690, 702, 703; 521/50
  See application file for complete search history.

(56) References Cited

U.S. PATENT DOCUMENTS

| 5,578,136 | A  | * | 11/1996 | Taylor et al. ................. 134/25.2 |
| 2003/0085383 | A1 | * | 5/2003 | Burnell-Jones .......... 252/301.36 |
| 2005/0090428 | A1 | * | 4/2005 | Compans et al. ................. 514/6 |
| 2006/0292059 | A1 | * | 12/2006 | DiMascio ...................... 423/477 |
| 2010/0311572 | A1 | * | 12/2010 | Seeber et al. ................. 502/159 |

OTHER PUBLICATIONS

International Search Report and Written Opinion for corresponding International Application No. PCT/PL2010/000016, mail date Jan. 11, 2011.
B. Paczkowsks A, et al. "Photochemical preparation of polymer-clay composites", Applied Clay Science, vol. 25, Feb. 7, 2004, pp. 221-227.

(Continued)

*Primary Examiner* — Joseph Drodge
*Assistant Examiner* — Cameron J Allen
(74) *Attorney, Agent, or Firm* — Myers Wolin, LLC

(57) ABSTRACT

The subject of the invention is a hybrid photocatalyst which is a layered aluminosilicate, possibly organically modified, containing compounds introduced into the aluminosilicate galleries bearing groups such as porphyrin, rose bengal, anthracene, pyrene, perylene, tetracene, rubrene, naphthalene, phthalocyanines, coumarins, and methylene blue, which are organic chromophores able to absorb visible and/or ultraviolet light and sensitize photochemical reactions. The invention includes also the methods of synthesis and application of the photocatalysts for the photocatalytical degradation of water pollutants.

23 Claims, 9 Drawing Sheets

(56) References Cited

OTHER PUBLICATIONS

Aloisig G et al., "Preparation and spectroscopic characterisation of intercalation products of clay and of clay-polypropylene composites with rhodamine B", Journal of Physics and Chemistry of Solids, vol. 67, May 1, 2006, pp. 909-914.

Cheng, M. et al, "Photocatalytic degradation of organic pollutants catalyzed by layered iron(II) bipyridine complex-clay hybrid under visible irradiation", Applied Catalysis B: Environmental, vol. 65, Jun. 6, 2006, pp. 217-226.

Takagi, S., et al "Porphyrin photochemistry in inorganic/organic hybrid materials: Clays, layered semiconductors, nanotubes, and mesoporous materials", Journal of Photochemistry and Photobiology C: Photochemistry Reviews, vol. 7, Oct. 1, 2006, pp. 104-126.

Schulz-Ekloff, G., et al., "Chromophores in porous silicas and minerals: preparation and optical properties", Microporous and Mesoporous Materials, vol. 51, Jan. 30, 2002, pp. 91-138.

Masaya Kawasumi, "The Discovery of Polymer-Clay Hybrids", Journal of Polymer Science: Part A: Polymer Chemistry, vol. 42 (2004) pp. 819-824.

R. B. Merrifield, "Solid Phase Peptide Synthesis. I. The Synthesis of a Tetrapeptide", Journal of the American Chemical Society, vol. 85, Jan. 31, 1963, pp. 2149-2154.

Blossey, et al., "Polymer-Based Sensitizers for Photooxidations", Journal of the American Chemical Society, vol. 95, Aug. 22, 1973, pp. 5820-5822.

X I O N G, et al., "Photosensitized Oxidation of Substituted Phenols on Aluminum Phthalocyanine-Intercalated Organoclay", Environ. Sci. Technol., vol. 39 (2005) pp. 651-657.

Wu, F., et al., "Photochemical formation of hydroxyl radicals catalyzed by montmorillonite", Chemosphere, vol. 72 (2008) pp. 407-413.

Xiong, Z., et al., "Enhanced Photodegradation of 2,4,6-Trichlorophenol over Palladium Phthalocyaninesulfonate Modified Organobentonite", Langmuir, vol. 21 (2005) pp. 10602-10607.

* cited by examiner though those containing ZnO, $Fe_2O_3$,
HYBRID PHOTOCATALYSTS, THE METHOD OF THEIR SYNTHESIS AND USE

CROSS REFERENCE TO RELATED APPLICATIONS

The present application is a continuation of International Application No. PCT/PL2010/000016, filed on Feb. 24, 2010, which claims priority to Polish Patent Application No. PL387344, as well as Polish Patent Application No. PL387345, both of which were filed on Feb. 25, 2009, the contents of each of which are incorporated herein by reference.

FIELD OF THE INVENTION

The subjects of the invention are: hybrid photocatalysts based on layered aluminosilicates, the method of their synthesis and their application in catalyzed photochemical reactions, particularly for the degradation of water pollutants in the natural conditions.

BACKGROUND OF THE INVENTION

The increasing pollution of the human natural environment has been becoming a growing problem, which, if unsolved, will negatively influence longevity and the quality of life. The pollution of water, particularly drinking water, is of immense importance, since quite soon it may become a factor limiting the growth of human civilization, both on global scale and on the scale of particular states, especially those already lacking water.

On one hand, the development of an universal and inexpensive method of water purification is desired, however, on the other hand, it is extremely difficult taking into account the variety of types of water pollutants, e.g. heavy metals, organic compounds (pesticides, chlorinated aromatic pollutants, antibiotics, surfactants), and bacteria.

The methods of water purification are very diverse. They are based on processes such as reverse osmosis, ion exchange, adsorption, ultrafiltration, distillation, and photooxidation. The majority of them, however, have limitations, mainly high energy consumption and low efficiency.

The photocatalytic method of water purification is applied since 70s. Its primary advantage is the use of renewable and environmentally safe solar energy. As opposed to other methods, which are based on the transfer of the pollutants from one medium to another, the photocatalytic method of water purification leads to the transformation of the pollutants into harmless compounds. It is also a quite universal method, which may be applied for the detoxification of various types of pollutants. Usually it involves application of semiconductors based on $TiO_2$, although those containing ZnO, $Fe_2O_3$, CdS, and ZnS are also studied. These photocatalysts are used in photocatalytic oxidation of organic water pollutants, although the mechanisms of their actions are known which are based on the reductive degradation of these pollutants and the removal of heavy metals. Their disadvantage, however, is the fact that most of the reactions they photocatalyze require irradiation with ultraviolet light.

The layered aluminosilicates are known such as kaolinite, montmorillonite (bentonite) mica, and talc. These minerals are composed of layers of joined tetrahedral $SiO_4$ groups. The layer of tetrahedral $SiO_4$ groups is combined with the layer of $Al^{3+}$ ions coordinated with six oxygen atoms forming octahedral groups. The layers are arranged in parallel forming piles. The transverse dimension of a layer is several hundred of nanometers, and the distance between them is about 1 nm, therefore these minerals are also termed nanoclays. Since a part of $Al^{3+}$ ions is replaced with ions with a lower positive charge ($Mg^{2+}$, $Fe^{2+}$), the layer has a negative charge which is neutralized with the ions occupying the space between layers (so called galleries), such as $Na^+$, $Li^+$, $Mg^{2+}$, or $Ca^{2+}$. These ions can be easily exchanged into other cations through ion exchange. Exchanging them with organic cations such as cationic surfactants leads to organically modified clays (organoclays), e.g. organically modified montmorillonite, such as commercially available Cloisite 30B. The organoclays have very low surface energy, therefore the polymeric chains and the monomer molecules may easily intercalate between organoclay layers. In the case of polymers only hydrophilic polymers may intercalate the layers of unmodified montmorillonite.

The synthesis of the photocatalysts by intercalation of a low molecular chromophore between the layers of the aluminosilicate was reported. The phthalocyanines intercalated into organically modified bentonite were applied for the oxidation of phenol ("Photosensitized oxidation of substituted phenols on aluminum phthalocyanine-intercalated organoclay" Environ. Sci. Technol. 2005, 39(2), 651-657), laponite containing an introduced chromophore which is a complex of bipyridine and $Fe^{2+}$ ions applied for the degradation of organic pollutants ("Photocatalytic degradation of organic pollutants catalyzed by layered iron(II) bipyridine complexclay hybrid under visible irradiation," Cheng, M.; Ma, W.; Chen, C.; Yao, J.; Zhao, J. Appl.Catal. B: Environ. 2006, 65(3-4), 217-226), organically modified bentonite containing sulfonated derivative of palladium phthalocyanine was applied for the degradation of 2,4,6-trichlorophenol ("Enhanced photodegradation of 2,4,6-trichlorophenol over palladium phthalocyaninesulfonate modified organobentonite," Xiong, Z.; Xu, Y.; Zhu, L.; Zhao, J. Langmuir 2005, 21(23), 10602-10607) and montmorillonite containing iron ions which, under irradiation, produced hydroxyl radical able to oxidize benzene ("Photochemical formation of hydroxyl radicals catalyzed by montmorillonite," Wu, F.; Li, J.; Peng, Z.; Deng, N. Chemosphere 2008, 72(3), 407-413). These photocatalysts, however, contain heavy metals, which may pass into the environment. In the case of photocatalytic method of water purification this is a disqualifying disadvantage.

Layered aluminosilicates have many different applications. One of them is the modification of polymer properties. The first hybrid polymer-aluminosilicate hybrid materials were obtained in 1986 within the Toyota Central Research and Development Laboratories, Inc.'s (TCRDL) research project ("The discovery of polymer-clay hybrids," Kawasumi, M. J.Polym.Sci. Part A: Polym.Chem., 2004, 42, 819-824). These studies have shown that even a slight addition of an aluminosilicate to the polymer causes significant improvement of thermal and mechanical properties of the polymer. The studies on hybrid polymer-aluminosilicate hybrid materials are very intensive. However, till now there are no hybrid materials described containing polymers which are photocatalysts.

BRIEF SUMMARY OF THE INVENTION

According to the invention the hybrid photocatalyst is a layered aluminosilicate, possibly organically modified, containing organic chromophores introduced into the galleries able to absorb visible and/or ultraviolet light and sensitize photochemical reactions wherein the organic chromophore is a compound containing at least one chromophoric group such as porphyrin, rose bengal, anthracene, pyrene, perylene, tetracene, rubrene, naphthalene, phthalocyanines, coumarins, and methylene blue.

Preferably, the compound being a chromophore is a polymer bearing chromophoric groups.

Preferably, the polymer contains chromophoric groups such as porphyrins, rose bengal (RB), anthracene, pyrene, perylene, tetracene, rubrene, naphthalene, phthalocyanines, coumarins, and methylene blue.

Preferably, in the case when the organic chromophore is not a polymer, it is covalently attached to the organic cation present between the aluminosilicate layers.

Preferably, the photocatalyst contains montmorillonite, kaolinite, hectorite, biotite, mica, talc, or bentonite as the layered aluminosilicate.

Preferably, as a layered aluminosilicate the photocatalyst contains montmorillonite organically modified by the introduction of ammonium cations, given in Formula 1, into the aluminosilicate layers.

Preferably, as a compound containing porphyrin chromophore, mezo-tetra(4-carboxyphenyl)porphine (4CP) is used, shown in Formula 2.

According to the invention the method of synthesis of hybrid photocatalysts from a unmodified or organically modified layered aluminosilicate is based on the reaction of a low molecular weight compound bearing a photoactive chromophore with an organic cation introduced previously between the aluminosilicate layers.

In the case the method of synthesis according to the invention concerns the photocatalysts containing polymers which bear chromophores attached, the polymer bearing the organic chromophores intercalates into the aluminosilicate galleries or the polymer is obtained from monomers intercalated previously into aluminosilicate galleries.

Preferably, the photoactive chromophore are porphyrins, rose bengal (RB), anthracene, pyrene, perylene, tetracene, rubrene, naphthalene, phthalocyanines, coumarins, and methylene blue.

Preferably, as a compound containing porphyrin chromophore, mezo-tetra(4-carboxyphenyl)porphine (4CP), is used.

Preferably, the polymeric photosensitizer is a polymer containing chromophoric groups such as porphyrins, rose bengal, anthracene, pyrene, perylene, tetracene, rubrene, naphthalene, phthalocyanines, coumarins, and methylene blue.

Preferably, the reaction of a low molecular weight compound is performed in a solvent in which the compound bearing the chromophore is soluble.

Preferably, a catalyst is used in the reaction of a low molecular compound with a cation.

Preferably, the process of polymer intercalation is performed by mixing the suspension obtained from the solution of a polymer containing organic chromophores and an aluminosilicate protected from light.

Preferably, the process of synthesis of the polymer from monomers intercalated previously into the aluminosilicate layers is carried out by intercalating a monomer or monomers into the aluminosilicate layers and initiating its polymerization or copolymerization using an initiator and/or by heating it to proper temperature.

Preferably, as a layered aluminosilicate montmorillonite is used, most preferably organically modified by the introduction of ammonium cations into the aluminosilicate layers.

The subject of the invention is also the use of hybrid photocatalysts according to the invention for the photocatalytic degradation of water pollutants.

Preferably, the photocatalysts are used to remove organic pollutants, particularly phenol, phenol derivatives, chlorinated aromatic pollutants, pesticides, polycyclic aromatic compounds, by their photocatalytic degradation. The photocatalysts can be also used for the removal of cyanides by their photocatalytic oxidation to cyanates.

DETAILED DESCRIPTION OF THE INVENTION

Figure 1A:
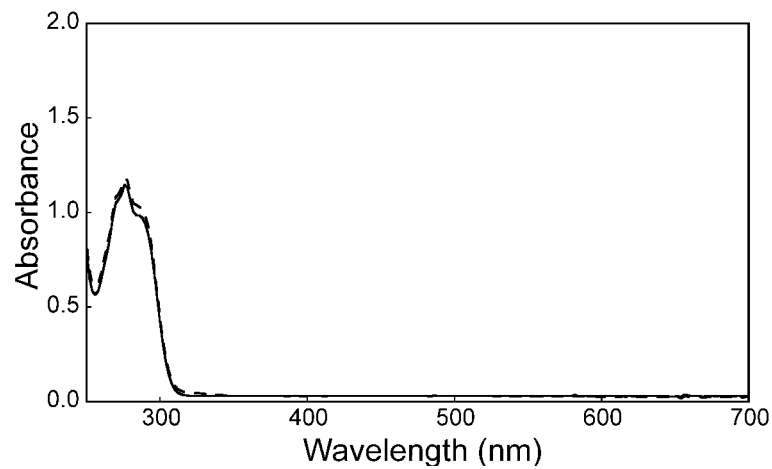
FIG. 1a depicts the UV spectra of phenol upon irradiation with light of $\lambda>380$ nm in the absence of C30B-4CP for 0 (solid line) and 240 minutes (dashed line).

It was found that hybrid photocatalysts according to the invention effectively degrade the impurities of water by oxidation with singlet oxygen and by photoinduced electron transfer. These processes may occur under illumination with light from near ultraviolet or visible spectral range.

Montmorillonite, organically modified with ammonium cations containing easily substituted hydroxyl groups, is the most preferable layered aluminosilicate used to obtain the photocatalysts. Thanks to covalent bonding between the low molecular chromophore with the aluminosilicate, the number of chromophores which can be introduced into the aluminosilicate is much higher than in the case of simple intercalation of the same compound.

The most preferable porphyrin chromophore is mezo-tetra (4-carboxyphenyl)porphine (4CP) since this chromophore absorbs visible light, it is a sensitizer of the singlet oxygen, does not contain a heavy metal (as opposed to the chromophores used to obtain similar aluminosilicate photocatalysts)), on the other hand, it contains four carboxyl groups, which can be used to immobilize the molecule.

More than one chromophore type may be introduced into the aluminosilicate, e.g. naphthalene chromophore and rose bengal chromophore. Both these chromophores are singlet oxygen photosensitizers. Since rose bengal absorbs in the visible range and naphthalene in the UV range of the spectrum, their content in the polymer composition enables absorption in a very wide spectral range and thereby more efficient use of solar energy for photosensitization reactions. In the case these two molecular groups are attached to the polymeric chain, the naphthalene chromophore may take part in the reactions involving electron transfer similar the reactions of SNp polymer and may transfer energy to RB chromophore. The efficiency of the photocatalyst is additionally increased by the occurrence of the antenna effect which is based on the absorption of the radiation quantum by a chromophore, transfer and migration of the absorbed energy among the chromophores attached to the polymeric chain and final transfer to the reaction centre which constitutes an energy trap.

According to the invention the application of the photocatalysts in the photocatalytic method of water purification combines the advantages of the two above mentioned methods: photochemical one, the advantage of which is the fact, that the source of energy required to drive a reaction of photochemical degradation of a pollutant is the solar radiation and adsorption method, which allows physical removal of a pollutant from water. As a main material by weight aluminosilicates are used which are inexpensive, easily accessible and nontoxic. Aluminosilicates undergo spontaneous separation from aqueous solution due to sedimentation which facilitates their separation after photoreaction is completed, as opposed to water-soluble photocatalysts which are difficult to remove from water. Application of a polymer containing chromophores attached to its chain allows introduction of many different chromophores between the aluminosilicate layers, which cannot be introduced there by another method. Moreover, it limits the aggregation of chromophores thereby improving the efficiency of the catalyst. Since the chromophores attached to the part of polymeric chain which did not undergo intercalation, i.e. that which resides in the solution, may absorb light and consequently become excited, they may initiate degradation of pollutant molecules present in the aqueous phase. The antenna effect, characteristic of chromophores attached to the polymeric chain, additionally increases the efficiency of the photocatalysts. It is important that the chromophores do not contain complexed metal ions, as opposed to similar photocatalysts obtained so far.

The subject of the invention was presented in more detail in the embodiments.

EXAMPLES

The following materials and reagents were used in the embodiments: Cloisite® 30B, which is a commercially available montmorillonite, modified by introduction of ammonium cations (C30B, Southern Clay Products, USA), montmorillonite K5 (Aldrich), mezo-tetra(4-carboxyphenyl) porphine (Porphyrin Products, Inc.), dimethyl sulfoxide (DMSO, analytical grade, POCh Gliwice), dimethylformamide (DMF, analytical grade, POCh Gliwice), methanol (analytical grade, Lach-Ner), pyridine (analytical grade, Lach-Ner), isobutyl chloroformate (98%, Aldrich), calcium hydride (90-95%, Aldrich), sodium hydrogen carbonate (analytical grade, POCh Gliwice), sodium carbonate (analytical grade, POCh Gliwice), pentachlorophenol (PCP, 99%, Aldrich) have been used without further purification. Phenol (pure, POCh Gliwice) was purified by crystallization in hexane. A 8452A Hewlett-Packard UV-Vis spectrophotometer with a diode array and a Waters liquid chromatograph with a PDA detector were used. The irradiations of samples were performed in a Rayonet photoreactor equipped in lamps emitting at the wavelength of about 350 nm or using a xenon lamp equipped with suitable filters.

Example 1

Synthesis of an Aluminosilicate Photocatalyst Containing Porphyrin Chromophores (C30B-4CP)

The synthesis was performed in a three-necked flask under nitrogen. 50 mg of mezo-tetra(4-carboxyphenyl)porphine (4CP) was dissolved in 5 ml of dry DMSO, the catalysts, i.e. 120 μl of pyridine and 30 μl of isobutyl chloroformate, were added and after 5 minutes a suspension of 0.5 g Cloisite 30 B in 15 ml of dry DMSO was added. The reaction mixture was mixed at 70° C. for 4 hours. The product obtained was filtered on a Buchner funnel with a sintered glass disc and washed with methanol till the transparent filtrate was obtained and then the product was dried in a vacuum dryer. A green powder was obtained.

Example 2

Studies on Aluminosilicate Photocatalyst Containing Porphyrin Chromophores

The possibility of the application of C30-4CP photocatalyst for photochemical removal of water pollutants which are derivatives of phenol. For studies on photocatalytic properties of C30B-4CP phenol was chosen as a model water pollutant. In a control experiment it was demonstrated that phenol irradiated with light of λ>380 nm (and therefore not absorbed by phenol) in the presence of C3OB which did not contain 4CP practically does not undergo photochemical reactions (FIG. 1a—UV spectra of phenol ($c_{phenol}$=7.3×10$^{-4}$ M) irradiated with light of λ>380 nm in the absence of C30B-4CP for 0 (solid line) and 240 min (dashed line)).

Figure 1B:
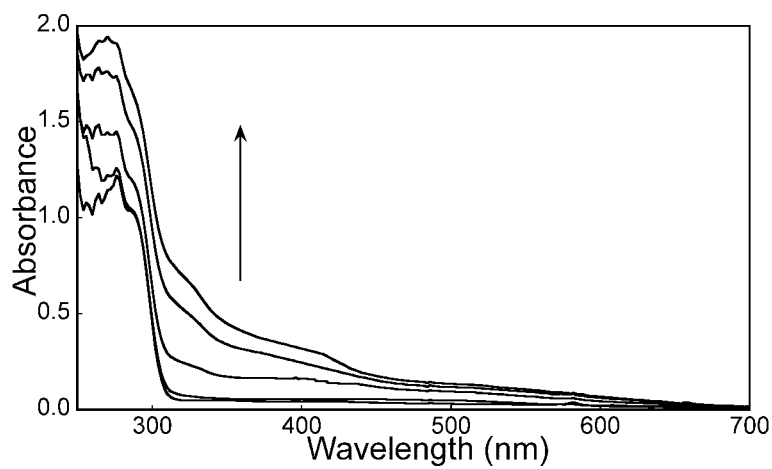
FIG. 1b depicts the UV spectra of phenol upon irradiation with light of $\lambda>380$ nm in the presence of 1.0 g/L C30B-4CP for 0, 30, 60, 150, and 240 minutes.

On the other hand, the spectra of phenol irradiated in the presence of C30B-4CP show noticeable change, i.e. increased absorption in the UV and visible spectral range. This increase is more pronounced in the short wavelength range. Changes of this type in phenol spectra are characteristic of the products of its oxidation (FIG. 1b—Phenol spectra ($c_{phenol}$=7.3×10$^{-4}$ M) irradiated with the wavelength of λ>380 nm in the presence of 1.0 g/l C30B-4CP for 0, 30 60, 150, and 240 min). The products of the oxidation of phenol and its derivatives are much less toxic and easily undergo further degradation in the natural environmental conditions.

Example 3

Synthesis of the Copolymer of Sodium Styrenesulphonate and 2-Vinylnaphthalene (SNp)

Poly(sodium styrenesuphonate-co-2-vinylnaphthalene) was obtained in the radical polymerization using 2,2'-azobis (isobutyronitrile) as an initiator. Polymerization was performed at 60° C. in DMSO degassed by a few freeze-pump-thaw cycles.

The polymerization was continued for 21 h and the polymer was precipitated with 1-butanol, filtered, washed thrice with diethyl ether and dried in a vacuum drier for 40° C.

The polymer obtained was dissolved in water and dialysed in deionized water using dialysis tubes with a cut-off value about 12-14 kDa and isolated through freeze-drying. The elemental analysis has indicated that the polymer obtained (Formula 3) contained 59 mol % of vinylnaphthalene and 41 mol % of sodium styrenesulphonate. In the case the polymer is obtained from monomers intercalated previously into the aluminosilicate layers the procedure described above is modified so that aluminosilicate is added to the concentrated solution of monomers and left for 3-4 days. Then, the initiator is added and, after a few hours, the temperature is raised to 60° C. After the polymerization reaction is completed, the aluminosilicate is filtered out, washed first with methanol and then with water.

Example 4

Synthesis of the Terpolymer of Sodium Styrenesulphonate, 2-Vinylnaphthalene, and Vinylbenzylchloride Substituted with Rose Bengal Chromophores (SNpRb)

The terpolymer poly(sodium styrenesuphonate-co-2-vinylnaphthalene-co-vinylbenzylchloride) was obtained in the radical polymerization using benzoyl peroxide as an initiator. Polymerization was performed in DMSO. The polymerization mixture was degassed by a few freeze-pump-thaw cycles at 60° C. The polymer was precipitated using an excess of 1-butanol, filtered out, washed with ether, and dried. The polymer was then dissolved in water and dialysed in deionized water using dialysis tubes with a cut-off value about 12-14 kDa and isolated through freeze-drying. The chromophores of rose bengal were attached using the method developed by Merrifield ("Solid Phase Peptide Synthesis. I. The Synthesis of a Tetrapeptide," Merrifield, R. B. *J.Am-.Chem.Soc.* 1963, 85(14), 2149-2154) and by Blossey et al. ("Polymer-based sensitizers for photooxidations." Blossey, E. C.; Neckers, D. C.; Thayer, A. L.; Schaap, A. P. *J.AmChem Soc.* 1973, 95(17), 5820-5822). The method is based on the reaction between the carboxylic groups of rose bengal and the chloromethylene groups of the vinylbenzylchloride mers in the polymer. The reaction of substitution of the polymer with rose bengal was performed at 80° C. for 20 h. Then the reagents were cooled down to room temperature, transferred into the dialysis tube and dialysed in order to remove unreacted rose bengal. The polymer substituted with rose bengal was isolated by freeze-drying. The analysis of the polymer obtained (Formula 4) has shown, that it contains 56.9 mol % of sodium styrenesulphonate, 39.9 mol % of 2-vinylnaphthalene, 2.23 mol % of vinylbenzyl chloride and 5.40 wt % of rose bengal. In the case the polymer is obtained from monomers intercalated previously into the aluminosilicate layers the procedure described above is modified so that aluminosilicate is added to the concentrated solution of monomers and left for 3-4 days. Then, the initiator is added and, after a few hours, the temperature is raised to 60° C. After the polymerization reaction is completed, the aluminosilicate is filtered out, washed first with methanol and then with water.

Example 5

Synthesis of Aluminosilicate Photocatalysts Containing SNp, and SNpRb Polymers Obtained According to Embodiments 3 and 4.

The example synthesis of the photocatalysts was as follows. 2 mg of the polymer was dissolved in 10 ml of water and 150 mg of Cloisite 30B was added. The suspension was mixed in the dark for 5 days, centrifuged and washed with water until no polymer was detected in the water used for washing by measuring UV-Vis absorption spectrum.

Example 6

The Studies on the Aluminosilicate Photocatalysts Containing Naphthalene Chromophores Attached to the Polymer The studies were carried out on the photocatalyst obtained from Cloisite® C30B containing intercalated SNp polymer.

Figure 2:
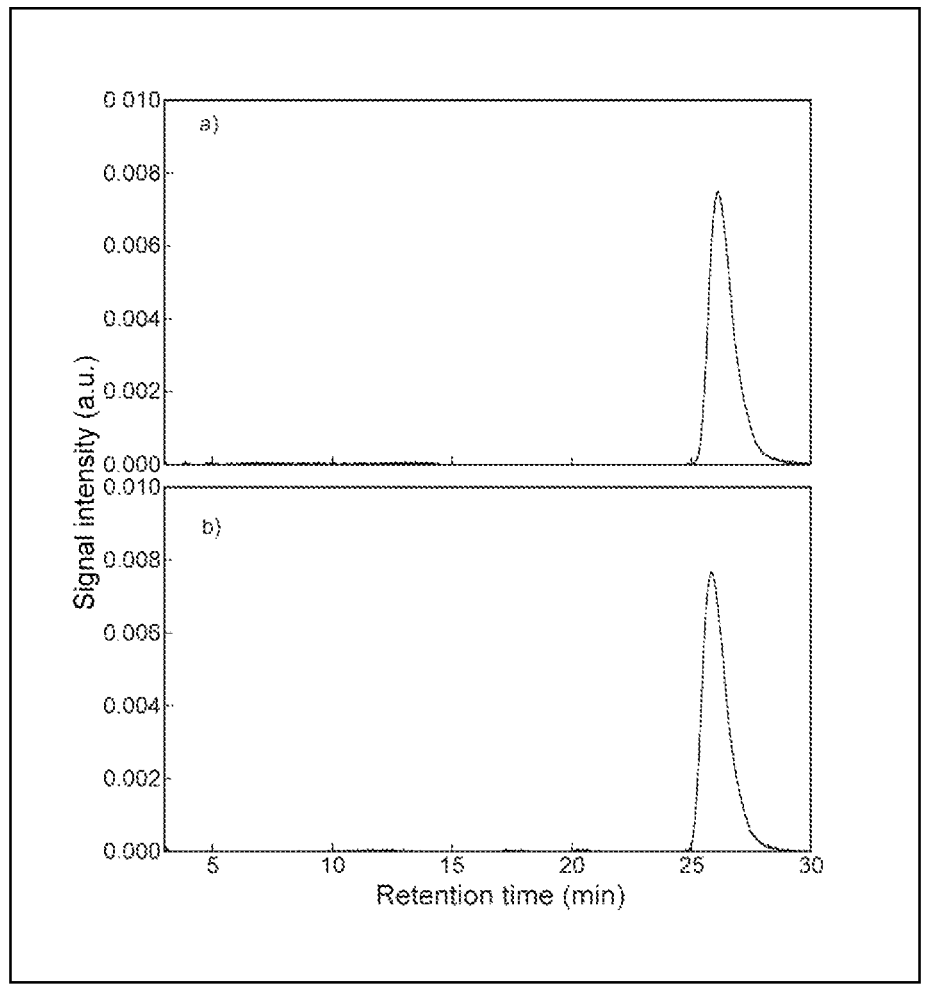
FIG. 2 depicts HPLC chromatograms of PCP ($c=6.5\times10^{-5}$ M) nonirradiated (a) and irradiated (b) with the wavelength of 350 nm for 120 min water containing 10% v/v methanol (UV detection, $\lambda_{det}=237$ nm).

The possibility to apply C30B-SNp catalyst in the degradation of pentachlorophenol (PCP) as a model organic chlorinated compound was studied. It was shown that the irradiation of PCP solution with the wavelength of 350 nm does not result in its noticeable degradation during 2 hours in the experimental conditions applied (FIG. 2—HPLC chromatograms of PCP ($c=6.5 \times 10^{-5}$ M) nonirradiated (a) and irradiated (b) with the wavelength of 350 nm for 120 min water containing 10% v/v methanol (UV detection, $\lambda_{det}=237$ nm)).

Figure 3:
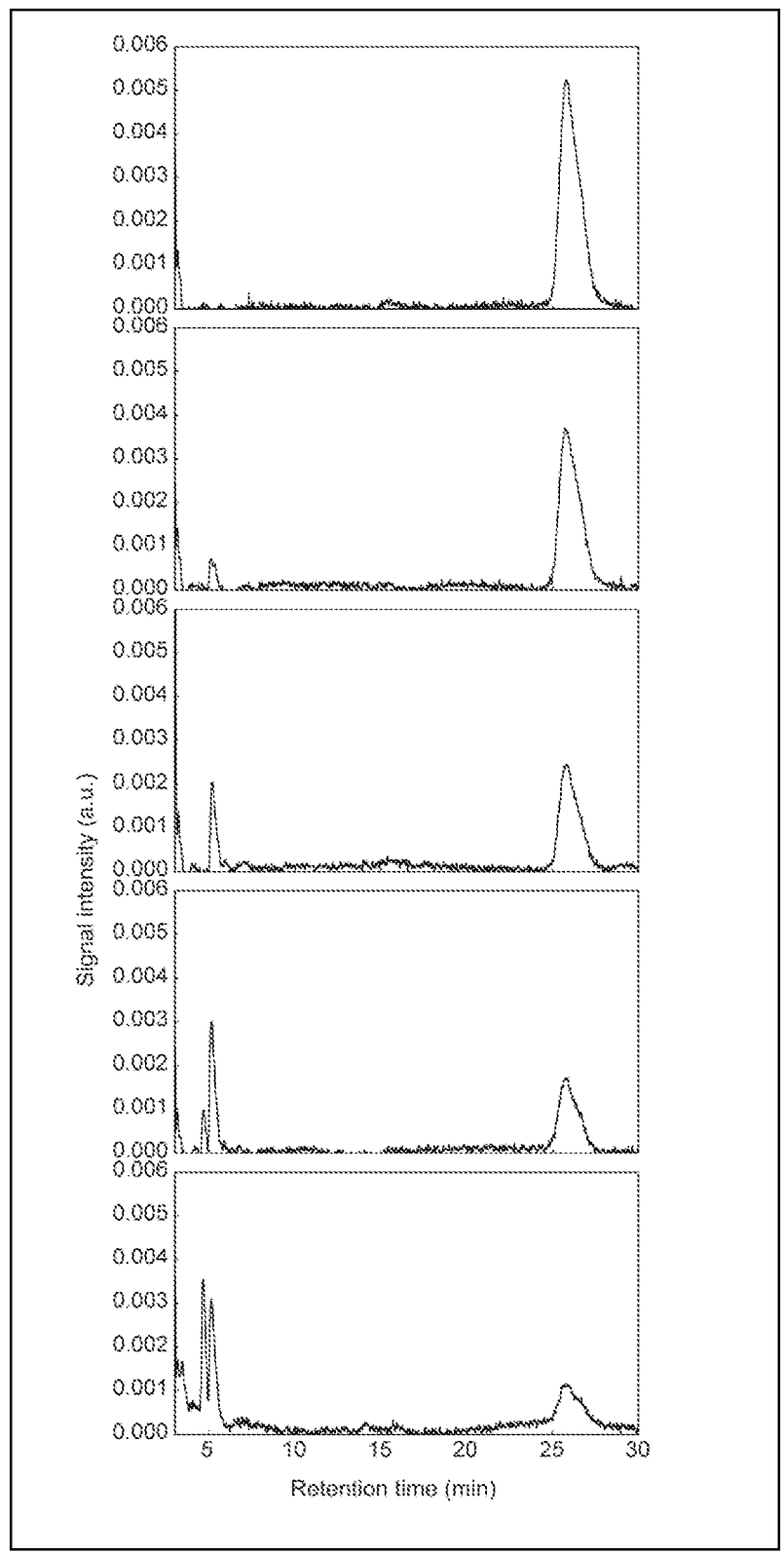
FIG. 3 depicts chromatograms of PCP solutions ($c_{PCP}=6.5\times10^{-5}$ M) in water containing 10% v/v of methanol irradiated ($\lambda_{irr}=350$ nm) in the presence of C30B-SNp (1.0 g/l) for 0, 5, 20, 60, and 120 min (UV detection, $\lambda_{det}=237$ nm).

Irradiation of PCP in identical conditions but in the presence of C30B-SNp leads to its fast degradation and the products formed having much shorter retention time, which is characteristic of the formation of dechlorination products (FIG. 3—chromatograms of PCP solutions ($c_{PCP}=6.5 \times 10^{-5}$ M) in water containing 10% v/v of methanol irradiated ($\lambda_{irr}=350$ nm) in the presence of C30B-SNp (1.0 g/l) for 0, 5, 20, 60, and 120 min (UV detection, $\lambda_{det}=237$ nm)).

Example 7

The Studies on the Aluminosilicate Photocatalyst Containing Naphthalene and Rose Bengal Chromophores Attached to the Polymer(C30B-SNpRb)

The studies on the application of C30B-SNpRb photocatalyst for the degradation of water pollutants were performed. Phenol and pentachlorophenol were chosen as model pollutants.

The Studies on the Oxidation of Phenol Using C30B-SNpRb Photocatalyst

Figure 4:
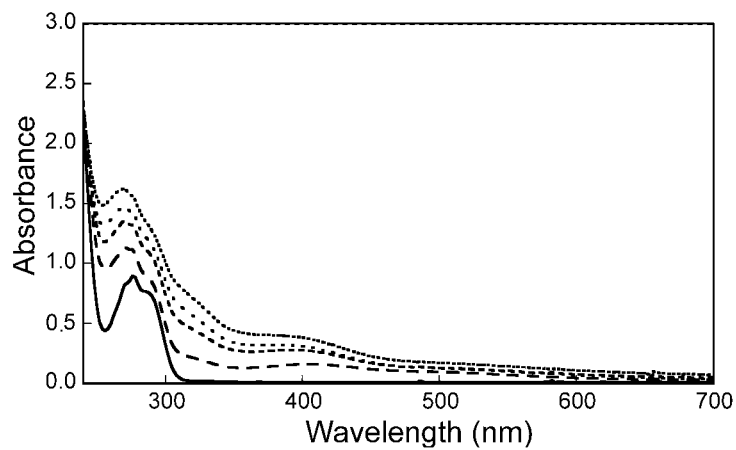
FIG. 4 depicts spectra of phenol solutions ($c=5.6\times10^{-4}$) in water irradiated in the presence of C30B-SNpRb (1.0 g/l) for 0, 30, 60, 90, and 120 min with the wavelength of $\lambda>380$ nm.

Irradiation of phenol solutions were carried out in the absence and in the presence of C30B-SNpRb photocatalyst. The light with wavelength of $\lambda_{irr}>380$ nm was used during irradiations, therefore this light was selectively absorbed by RB chromophores and was not absorbed by phenol and naphthyl chromophores. As was already found previously (FIG. 1a), the irradiation of phenol solutions in these conditions does not result in noticeable changes in their absorption spectra which indicates that phenol does not undergo any photochemical reactions. On the other hand, irradiation of phenol solutions in water in the presence of C30B-SNpRb leads to noticeable changes (FIG. 4—spectra of phenol solutions ($c=5.6 \times 10^{-4}$) in water irradiated in the presence of C30B-SNpRb (1.0 g/l) for 0, 30, 60, 90, and 120 min with the wavelength of $\lambda>380$ nm), analogous to those which occur during the irradiation of the phenol solution in the presence of another photocatalyst generating singlet oxygen, i.e. C30B-4CP (FIG. 1b), indicating that very efficient photooxidation of phenol takes place.

Figure 5:
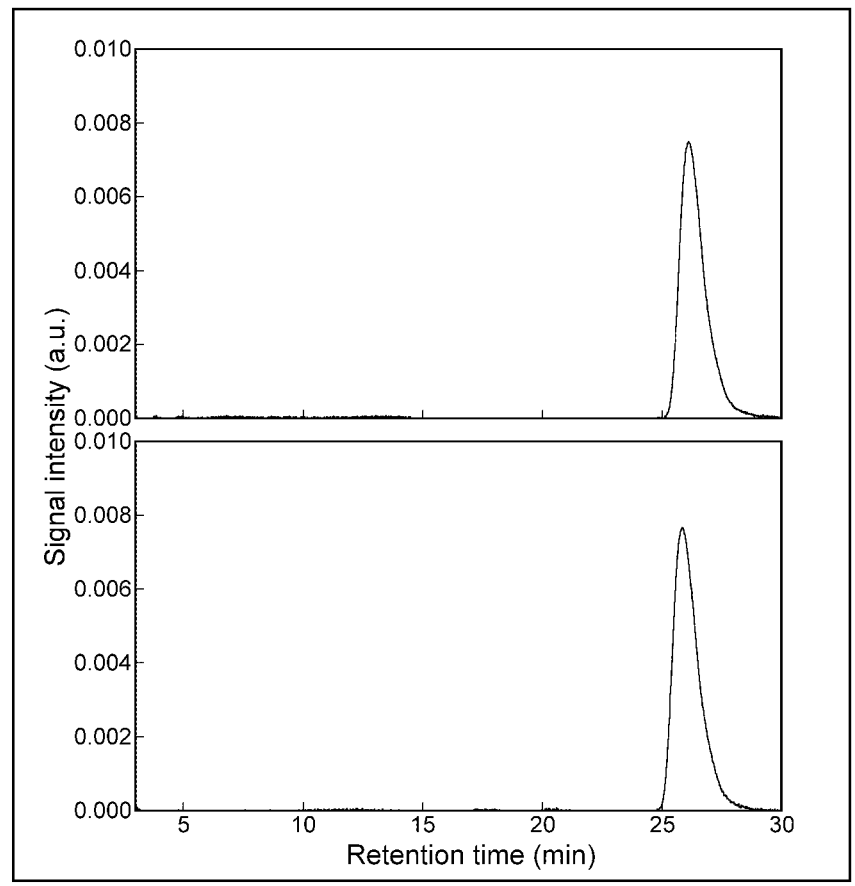
FIG. 5 depicts HPLC chromatograms of PCP ($c=6.5\times10^{-5}$ M) irradiated with $\lambda_{irr}>470$ nm light in the absence of C30B-SNpRb in the degassed solution for 0 and 60 min (UV detection, $\lambda_{det}=302$ nm).

The studies on the degradation of PCP photocatalyzed by C30B-SNpRb were also performed. It was shown that PCP does not undergo degradation when irradiated in degassed solutions with the light of $\lambda>470$ nm (FIG. 5—HPLC chromatograms of PCP ($c=6.5 \times 10^{-5}$ M) irradiated with $\lambda_{irr}>470$ nm light in the absence of C30B-SNpRb in the degassed solution for 0 and 60 min (UV detection, $\lambda_{det}=302$ nm)).

Figure 6:
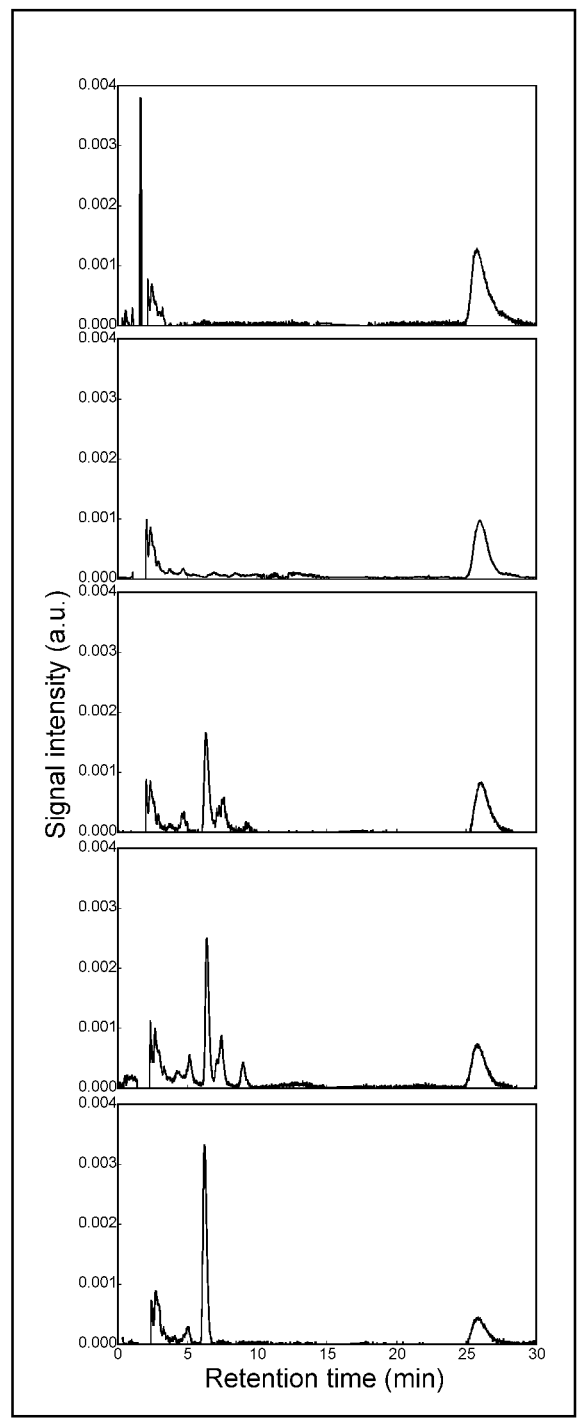
FIG. 6 depicts HPLC chromatograms of degassed PCP solutions ($c=6.5\times10^{-5}$ M) irradiated with $\lambda_{irr}>470$ nm light in the presence of C30B-SNpRb (1.0 g/l) for 0, 15, 30, 45, and 60 min (UV detection, $\lambda_{det}=302$ nm).

The analysis of chromatograms of PCP irradiated in the degassed solution in the presence of C30B-SNpRb has shown that during 60 minutes its concentration significantly decreased (down to 30% of its initial value) and that low molecular weight compounds are formed, whose concentration also decreases during irradiation (FIG. 6—HPLC chromatograms of degassed PCP solutions (c=6.5×10$^{-5}$ M) irradiated with $\lambda_{irr}$>470 nm light in the presence of C30B-SNpRb (1.0 g/l) for 0, 15, 30, 45, and 60 min (UV detection, $\lambda_{det}$=302 nm)).

Figure 7:
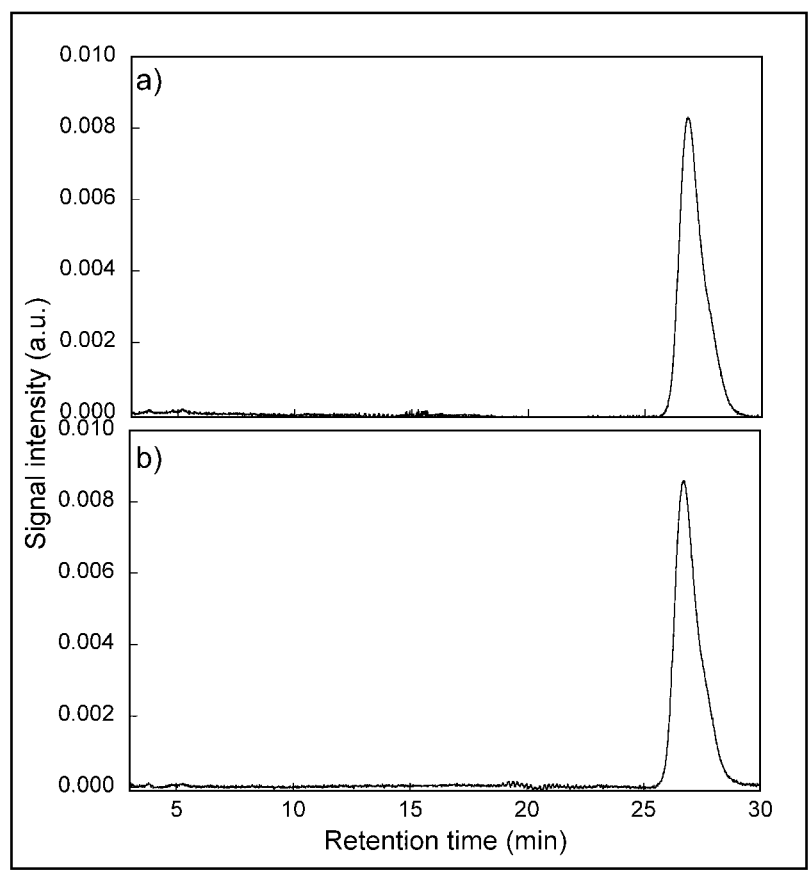
FIG. 7 depicts HPLC chromatograms of aerated PCP solutions ($c=6.5\times10^{-5}$ M) irradiated with $\lambda_{irr}>470$ nm light in the absence of the C30B-SNpRb photocatalyst for 0 and 120 min (UV detection, $\lambda_{det}=302$ nm).

Analogical experiments were performed in the aerated solutions. Like in the case of degassed solutions, the irradiation of PCP solution with the light absorbed by rose bengal chromophores in the absence of the photocatalyst does not result in noticeable changes of PCP concentration (FIG. 7—HPLC chromatograms of aerated PCP solutions (c=6.5×10$^{-5}$ M) irradiated with $\lambda_{irr}$>470 nm light in the absence of the C30B-SNpRb photocatalyst for 0 and 120 min (UV detection, $\lambda_{det}$=302 nm)).

Figure 8:
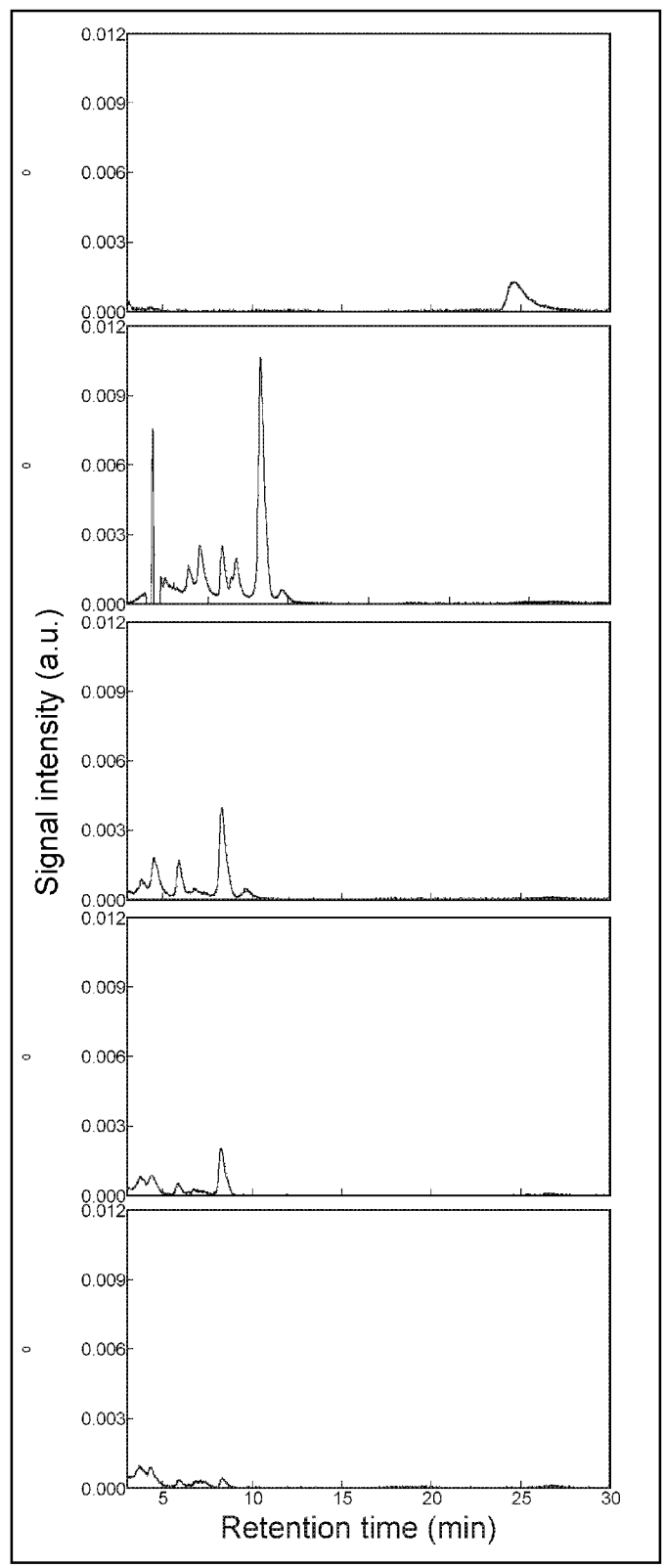
FIG. 8 depicts HPLC chromatograms of aerated PCP solutions irradiated with $\lambda_{irr}>470$ nm light in the presence of the C30B-SNpRb photocatalyst for 0, 15, 30, 60, and 120 min (UV detection, $\lambda_{det}=302$ nm).

As a result of the irradiation of PCP solutions in identical conditions in the presence of the C30B-SNpRb photocatalyst the PCP concentration decreases below the level of detection within as short as 15 minutes and also in this case low molecular weight products are formed (FIG. 8—HPLC chromatograms of aerated PCP solutions irradiated with $\lambda_{irr}$>470 nm light in the presence of the C30B-SNpRb photocatalyst for 0, 15, 30, 60, and 120 min (UV detection, $\lambda_{det}$=302 nm)). These products also undergo degradation during irradiation and after 120 minutes of irradiation all of the substances absorbing at the wavelength of 302 nm used for the detection undergo degradation.

The possibility to apply the C30B-SNpRb photocatalyst to degrade PCP was also checked using UV light absorbed by the naphthyl chromophore ($\lambda_{irr}$=265 nm).

Figure 9:
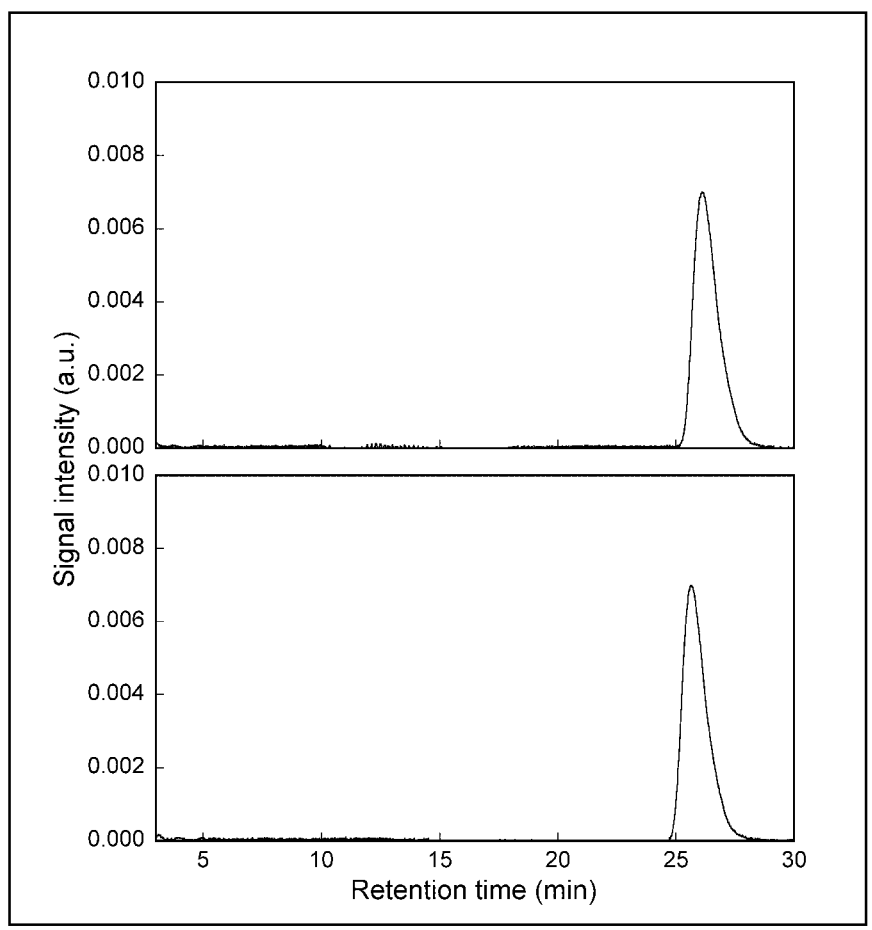
FIG. 9 depicts HPLC chromatograms of aerated PCP solutions irradiated with $\lambda_{irr}=265$ nm light in the absence of the C30B-SNpRb photocatalyst for 0 and 120 min (UV detection, $\lambda_{det}=302$ nm).

Irradiation of aerated PCP solutions with $\lambda$=265 nm radiation did not result in the changes of its concentration at the radiation intensity used (FIG. 9—HPLC chromatograms of aerated PCP solutions irradiated with $\lambda_{irr}$=265 nm light in the absence of the C30B-SNpRb photocatalyst for 0 and 120 min (UV detection, $\lambda_{det}$=302 nm)).

Figure 10:
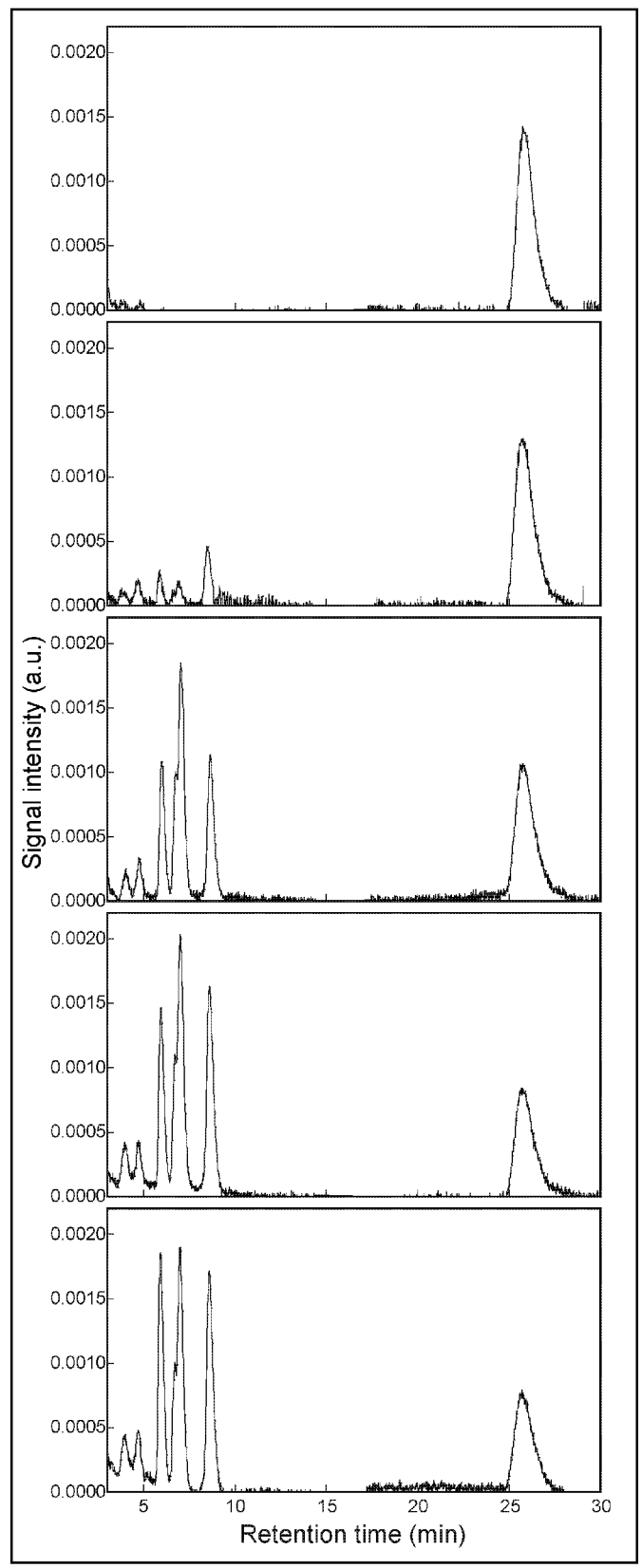
FIG. 10 depicts HPLC chromatograms of aerated PCP solutions irradiated with $\lambda_{irr}=265$ nm light in the presence of the C30B-SNpRb photocatalyst for 0, 15, 60, 90, and 120 min (UV detection, $\lambda_{det}=302$ nm).

If the same PCP solution is irradiated in the presence of the C30B-SNpRb photocatalyst, a decrease of PCP concentration is observed (FIG. 10—HPLC chromatograms of aerated PCP solutions irradiated with $\lambda_{irr}$=265 nm light in the presence of the C30B-SNpRb photocatalyst for 0, 15, 60, 90, and 120 min (UV detection, $\lambda_{det}$=302 nm)). However, it is slower than during irradiation with $\lambda_{irr}$>470 nm which probably results from the lower intensity of radiation transmitted through the interference filter.

We claim:

1. A hybrid photocatalyst comprising a layered aluminosilicate, at least one organic chromophore introduced into aluminosilicate galleries of said photocatalyst, wherein said chromophore is able to absorb visible and/or ultraviolet light and sensitize photochemical reactions, and wherein the organic chromophore is a compound containing at least one chromophoric group selected from the group consisting of porphyrin, rose bengal, anthracene, pyrene, perylene, tetracene, rubrene, naphthalene, phthalocyanines, coumarins, and methylene blue, wherein said chromophore does not contain cations of heavy metals, wherein the photocatalyst is useful for degradation of water pollutants, wherein the layered aluminosilicate is an organically modified layered aluminosilicate, wherein the organic chromophore is a polymer bearing at least one chromophoric group, and wherein the organic chromophore is covalently attached to the organic cations present between the aluminosilicate layers.

2. The hybrid photocatalyst according to claim 1 wherein the polymer contains at least one chromophoric group selected from the group consisting of porphyrins, rose bengal, anthracene, pyrene, perylene, tetracene, rubrene, naphthalene, phthalocyanines, coumarins, and methylene blue.

3. The hybrid photocatalyst according to claim 1 wherein the layered aluminosilicate is selected from the group consisting of montmorillonite (bentonite), kaolinite, hectorite, biotite, mica, and talc.

4. The hybrid photocatalyst according to claim 3 wherein the layered aluminosilicate used is montmorillonite organically modified by the introduction of ammonium cations into the aluminosilicate galleries.

5. The hybrid photocatalyst according to claim 1 wherein the chromophore is a porphyrin chromophore, mezo-tetra(4-carboxyphenyl)porphine.

6. A method of synthesis of the hybrid photocatalyst, according to claim 1, the method comprising reacting a layered aluminosilicate with an intercalated low molecular weight compound comprising a photoactive organic-cation-containing chromophore.

7. The method according to claim 6 wherein the reaction is performed in a solvent in which the compound bearing the chromophore is soluble.

8. The method according to claim 6 wherein a catalyst is used in the reaction.

9. The method according to claim 6 wherein said chromophore is a porphyrin chromophore.

10. The method of claim 9, wherein said chromophore is mezo-tetra(4-carboxyphenyl)porphine.

11. The method according to claim 6 wherein the layered aluminosilicate is selected from the group consisting of montmorillonite, kaolinite, hectorite, biotite, mica, talc and bentonite.

12. The method according to claim 6 wherein the layered aluminosilicate is montmorillonite organically modified by introduction of ammonium cations into the aluminosilicate galleries.

13. A method of synthesis of the hybrid photocatalyst according to claim 1, the method comprising reacting a layered aluminosilicate with an intercalated polymer comprising a photoactive chromophore.

14. The method of claim 13, wherein said polymer is a polymerization product of monomers previously intercalated into aluminosilicate galleries of the layered aluminosilicate.

15. The method according to claim 13 further comprising an intercalation process, the process comprising mixing a suspension obtained from a solution of a polymer containing organic chromophores and an aluminosilicate, protected from light.

16. The method according to claim 13 further comprising polymer synthesis, the synthesis comprising intercalating monomers into the aluminosilicate galleries and initiating polymerization of said monomers using method selected from the group consisting of use of an initiator, heating to a proper temperature, or combination thereof.

17. The method of claim 16, wherein the monomers comprise a plurality of monomer structures and the polymer is a copolymer.

18. The method according to claim 13 wherein the layered aluminosilicate is selected from the group consisting of montmorillonite, kaolinite, hectorite, biotite, mica, talc or bentonite.

19. The method according to claim 18 wherein the layered aluminosilicate is montmorillonite organically modified by the introduction of ammonium cations into the aluminosilicate galleries.

20. A method of water purification comprising photocatalytically degrading water impurities by contacting water comprising impurities with the hybrid photocatalyst of claim 1.

21. The method of claim 20, wherein the water impurity is a cyanide and the photocatalytic degradation is photocatalytic oxidation of said cyanide to a cyanate.

22. The method of claim 20 wherein the photocatalyst is applied for removal of organic pollutants.

23. The method of claim 22, wherein the organic pollutant is selected from the group consisting of phenol, phenol derivatives, chlorinated aromatic pollutants, pesticides, polycyclic aromatic compounds, and combinations thereof.

* * * * *